United States Patent [19]
Bubik

[11] 3,804,206
[45] Apr. 16, 1974

[54] RAMP HOIST
[75] Inventor: Leslie Bubik, Toronto, Ontario, Canada
[73] Assignee: Vulcan Equipment Company, Ltd., Toronto, Ontario, Canada
[22] Filed: July 28, 1972
[21] Appl. No.: 276,226

[52] U.S. Cl. ............................. 187/8.52, 187/8.71
[51] Int. Cl. ........................................... B60s 13/00
[58] Field of Search................ 187/8.41, 8.52, 8.71

[56] References Cited
UNITED STATES PATENTS
| | | | |
|---|---|---|---|
| 3,387,722 | 6/1968 | Fisher | 187/8.71 |
| 3,216,530 | 11/1965 | Hunter | 187/8.52 |
| 2,576,544 | 11/1951 | Smith | 187/8.52 |

FOREIGN PATENTS OR APPLICATIONS
1,304,213 9/1961 France ............................... 187/8.71

*Primary Examiner*—Allen N. Knowles

[57] ABSTRACT

A ramp type vehicle hoist having a pair of ramps pivotal upwardly from a ground engaging position, with rams interconnecting a ground frame portion with the ramps, to permit raising of a vehicle upwardly into level or a forwardly tilting position, and a pair of chocks with a manual control lever to set the chocks in a partially retracted position, for passage of a pair of vehicle wheels thereover, the passage of the wheels serving to release the chocks upwardly into a wheel engaging position.

8 Claims, 5 Drawing Figures

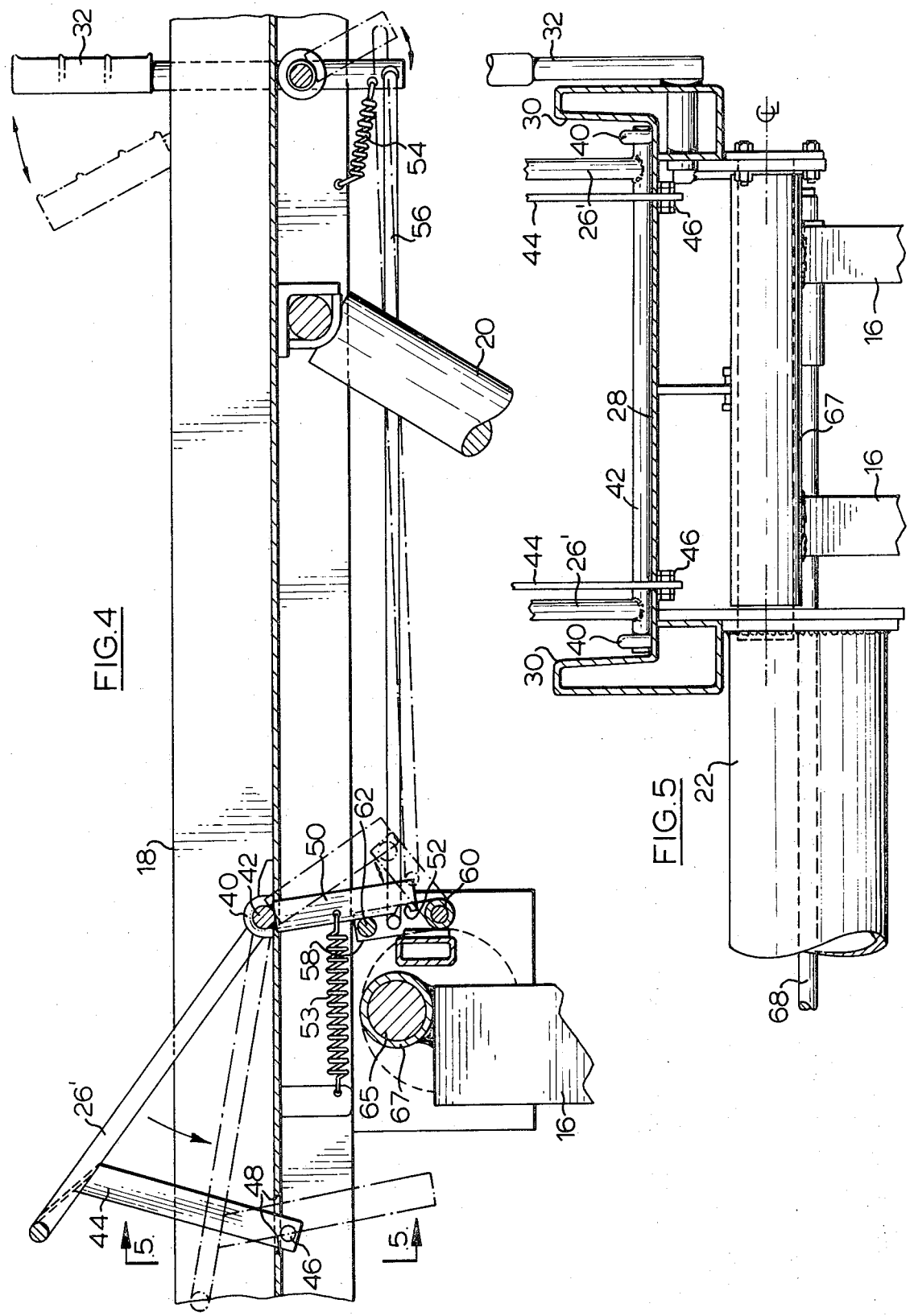

RAMP HOIST

This invention is directed to a vehicle hoist and in particular to a hoist of the ramp type having safety chocks to secure a vehicle in chocked relation thereon.

In the hoisting art the type of hoist normally utilized in garages for raising vehicles in the air for servicing purposes utilizes a central pneumatic ram having a rigid horizontal H-frame mounted thereon, the ram being mounted on a subterranean foundation to permit driving of vehicles onto the H-frame from ground level. Hand positioned chocks are positioned beneath the vehicle, when located over the hoist, so as to pick up fixed portions of the vehicle chassis when the hoist is raised.

This type of prior arrangement suffers from a considerable number of disadvantages, such as high initial cost; the requirement to install the air ram in a pit; the need to provide a ram of sufficient stiffness to accept considerable eccentric loads; the need to hand position pick-up chocks in chassis or axle engagement. A further and major disadvantage of the prior art arrangements is the fact that such hoists constitute a fixed facility which ties up high cost floor space, while the high initial cost tends to limit the number of hoists that may be reasonably provided. Further disadvantages of these prior art hoists are: the need to locate strong pick-up points on the respective vehicle to be hoisted, which may not be readily determined, particularly with the vehicle at ground level prior to hoisting, and especially in the case of automobiles of unitized body construction not possessing a chassis; and the fact that the vehicle may not readily be canted in a forward or aft position for purposes such as to facilitate sump drainage when draining the oil from the engine, owing to the rigid geometry of the hoist and its straight up and straight down hoisting capability.

The present invention provides a vehicle hoist of teeter-totter like construction, utilizing hydraulic or air rams to raise the vehicle into a fully elevated servicing position. The platform of the hoist comprises a pair of channel-like ramps pivotally mounted intermediate the ends thereof upon a pair of pedestals carried by spaced frame members underlying the ramps. The frame members serve an additional function as skids, permitting the hoist to be readily relocated for optimum space utilization.

Wheel barriers are provided at the top ends of the ramps, being of such height as to permit considerable forward canting of a vehicle thereagainst with no tendency of the wheels to climb the barriers. Also provided in a hand settable chocking arrangement to retain a vehicle in chocked mounted relation upon the hoist.

In the embodiment herein described the chocks are located adjacent the forward barriers so that the leading pair of wheels of a vehicle mounted on the hoist are trapped, with little or no capability of movement, between the respective barrier and chock.

The present invention thus provides a vehicle hoist for elevating a vehicle, comprising: a platform having a pair of substantially parallel spaced elongated ramps with one end thereof movable to a position adjacent the ground to receive in operation the wheels of a vehicle thereon; barrier means adjacent the other end of the platform to prevent the passage of a vehicle therepast; platform support means supporting the platform for pivoting movement about an axis extending transversely of the ramps; ram means spaced from the support means connected with the platform to raise the one end, and chock means on the platform movable in operation from a first position permitting passage of a vehicle wheel therepast, to a second wheel reverse blocking position, to retain a vehicle in chocked relation adjacent the barrier means.

A further advantage of the present arrangement is that the running gear, wheels, springs, etc. and particularly transmission components are maintained in substantially normal operating relationship with the rest of the vehicle, to facilitate inspection and fault detection such as diminished clearances.

It will also be obvious that the present apparatus may be used in wheel alignment.

Certain embodiments of the present invention are described, reference being made to the accompanying drawings, wherein:

FIG. 4 is a side elevational view of the chock control mechanism; and

FIG. 5 is a front view of one-half of the hoist, taken in the direction 5—5 of FIG. 4.

Figure 1:
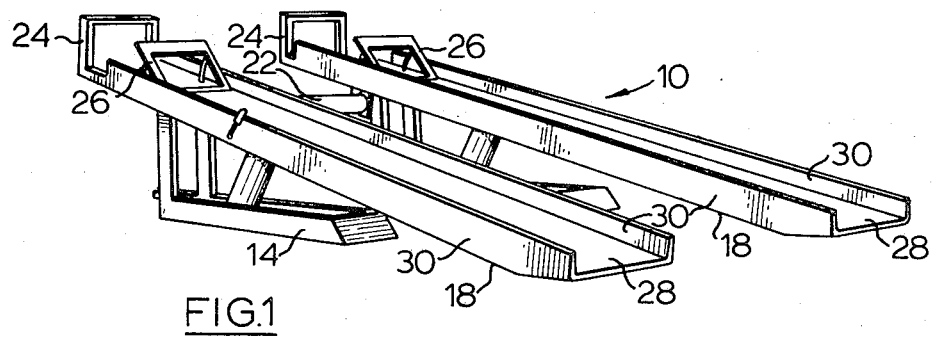
FIG. 1 is a general view of a hoist according to the present invention.
Figure 2:
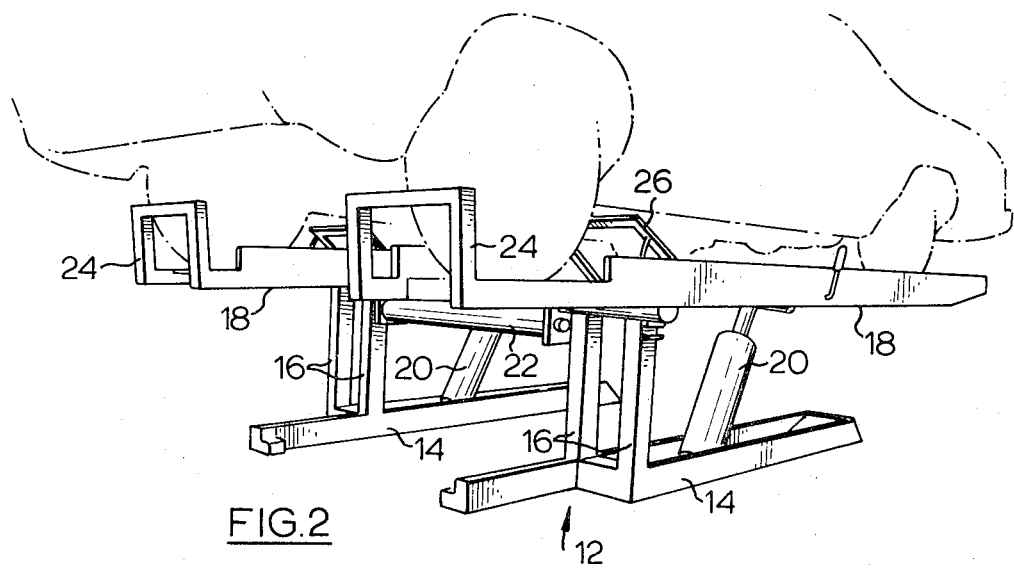
FIG. 2 shows the hoist in a level raised position, with indications of a vehicle mounted thereon.
Figure 3:
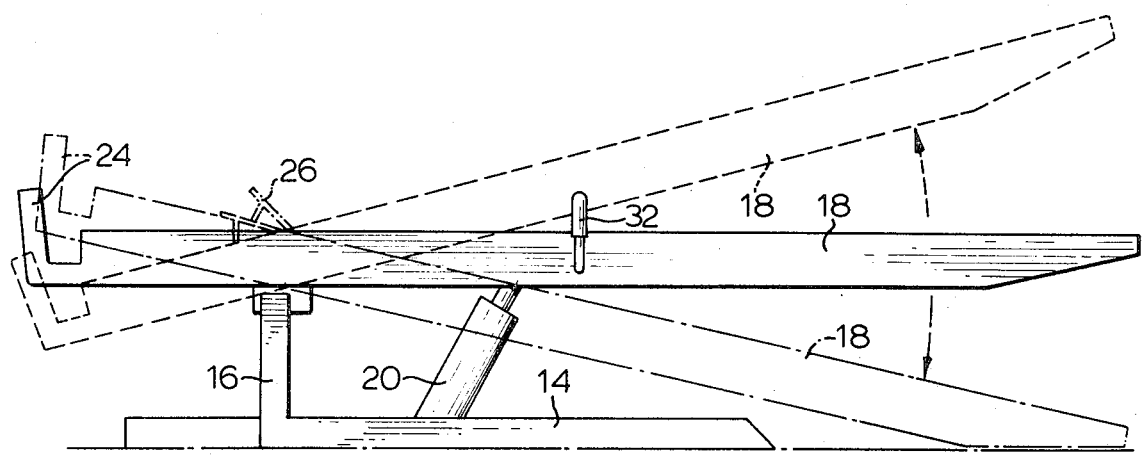
FIG. 3 is a side elevation showing a range of ramp positions from fully lowered to fully raised.

Referring to FIGS. 1, 2 and 3, the hoist 10 has a support frame 12 comprising ground contacting frame members 14, each having a pair of upstanding pedestal members 16, shown as being of box section. A pair of ramps 18 pivotally mounted to the pedestals 16 (see FIG. 5) are supported by air or hydraulic rams 20. The ramps 18 are interconnected by a shaft 22, and each ramp is provided with a barrier frame 24 and a chock frame 26, forming with the respective barrier 24 a wheel trapping recess.

The ramps 18 being of channel form with bottom members 28 and sides 30 are of chambered construction at the rear or lower end, to reduce ground clearance when lowered and thus facilitate the passage of vehicle wheels thereover.

Referring particularly to FIG. 3 the platform is shown in a level elevated position (solid line); in a forward canted position (dotted line), and in an initial loading position (chain dotted).

The chock control lever 32 is shown in the activated position, with the chocks appropriately raised, for the intermediate level position.

Referring to FIGS. 4 and 5, the details of the chock control mechanism are as follows:

The chocks 26 are pivotally mounted at 40 on the bottom members 28 of the ramps 18. Each chock 26 includes side members 26'; a pivot shaft 42; a pair of limit arms 44 carrying stop members 46 and passing through slot walls 48 in ramp bottom members 28; and an extension lever 50 having a catch recess 52 therein. Spring 53 fraises the extension lever 50 and the chock 26 to the raised or wheel blocking position.

Chock control lever 32 is fraised by spring 54 to the upright position, shown in solid line, being connected by rod 56 to a latch lever 58. The latch lever 58 is pivoted at 60 and carries a pin 62 for engagement with catch recess 52 of lever 50, when at the position shown in phantom in FIG. 4.

In operation, movement of the chock control lever 32 forwardly, from right to left in an anti-clockwise direction pivots the latch lever 58 anti-clockwise, i.e., rearwardly from left to right, from the upright position shown in solid to that shown in phantom.

The pin 62 acts against the chock extension lever 50, moving the chock 26 downwardly against the tension of spring 53, until, in the position shown in phantom in FIG. 4 the chock 26 approaches the ramp bottom member 28, and the latch pin 62 enters and engages the catch recess 52, to lock the chock down.

The passage of a vehicle wheel over the chock 26, in either direction, chock 26 is further depressed, thereby releasing the latch pin 62 from the catch recess 52. The chock 26 is then freed and is urged upwardly by spring 53 to the fully raised position (shown solid). Simultaneously, the chock control lever 32 is also urged upwardly by its return spring 54.

Also illustrated in FIGS. 4 and 5 is the trunnion pin 65 and its related trunnion housing 67. The trunnion housings 67 are secured to the pedestals 16, while the pin 65 carries the interconnecting shaft 22 which unifies the two ramps 18.

In interconnecting tension shaft 68, an extension of the pivot 60, synchronizes the action of the chock latches on both sides of the hoist.

One or more control levers 32 may be provided.

It will be seen that the present invention provides a single, robust hoist embodying a number of safety and convenient features. Worthy of note is the precision of vehicle canting that may be achieved by the use of air or hydraulic ram activators 20, permitting precise angular canting of a vehicle, as desired.

While not illustrated, it will be understood that in addition to the hydraulic or air ram actuators "dead" stops may be provided to prevent sagging of the hoist due to hydraulic failure or inadvertence. However, the ground-to-vehicle clearance is such that substantial safety clearance exists at most locations in the working zone beneath the vehicle.

What is claimed is:

1. A portable vehicle hoist for elevating a vehicle comprising:

a pair of parallel spaced apart continuous elongate ramps;

a rigid shaft extending between said ramps intermediate the length thereof;

said ramps each having free ends, a first one of said ends being movable into a ground-contacting attitude;

a horizontally extending ground frame underlying said ramps;

supporting pedestal means extending upward from said ground frame intermediate the length thereof;

said ramps being pivotally connected intermediate their respective lengths to said pedestal means for movement about a horizontal axis normal to said ramps;

reversible means for rotating said ramps about said axis from said ground-contacting attitude through a horizontal plane parallel to said ground frame;

and barrier means adjacent a second end of each of said ramps to prevent movement of a vehicle over said second ends.

2. A portable vehicle hoist as claimed in claim 2 wherein said reversible means for rotating said ramps comprises fluid operated ram means, pivotally connected between said ramp means and said ground frame.

3. A portable vehicle hoist as claimed in claim 2 wherein said fluid operated ram means comprises a pair of parallel hydraulic rams extending between said ramps and said ground frame, one under each of said ramps.

4. A portable vehicle hoist as claimed in claim 3 wherein said ground frame comprises a pair of channel members disposed in spaced apart parallel relationship one underlying each of said ramp members.

5. A portable vehicle hoist as claimed in claim 2 further including chock means, one individual to each of said ramps, movable from a first position permitting passage of a vehicle wheel therepast to a second wheel-reverse blocking position to retain said vehicle wheel in chocked relation adjacent said barrier means.

6. The hoist as claimed in claim 5 having chock setting means movable to a first position to position said chock means in said first position.

7. The hoist as claimed in claim 6, said chock setting means including latch means securing said chock setting means in said first position.

8. The hoist as claimed in claim 7 having latch release means, operable on depression of said chock means beyond said first chock position, as on passage of a vehicle wheel thereover, to release said latch securing means whereby said chock means is freed by the latch for movement to said second position.

* * * * *